(12) United States Patent
Suzuki

(10) Patent No.: US 7,975,954 B2
(45) Date of Patent: Jul. 12, 2011

(54) RECORDING TAPE ATTACHING METHOD AND RECORDING TAPE ATTACHING APPARATUS

(75) Inventor: Takayuki Suzuki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/464,109

(22) Filed: May 12, 2009

(65) Prior Publication Data

US 2009/0283621 A1 Nov. 19, 2009

(30) Foreign Application Priority Data

May 19, 2008 (JP) ................... 2008-130827

(51) Int. Cl.
*B65H 75/28* (2006.01)

(52) U.S. Cl. .................................... 242/532.2

(58) Field of Classification Search ............... 242/532, 242/532.1, 532.2; 360/132, 134
See application file for complete search history.

(56) References Cited

U.S. PATENT DOCUMENTS

| 3,861,611 | A | * | 1/1975 | Esashi et al. | 242/326.2 |
|---|---|---|---|---|---|
| 3,889,892 | A | * | 6/1975 | Melead | 242/527.3 |
| 3,961,763 | A | * | 6/1976 | Somers | 242/346.1 |
| 4,347,549 | A | * | 8/1982 | Fechner | 361/212 |
| 4,632,327 | A | * | 12/1986 | Kreeft et al. | 242/527.7 |
| 4,699,328 | A | * | 10/1987 | Kreeft et al. | 242/527.7 |
| 4,709,290 | A | * | 11/1987 | Schoettle et al. | 242/345.3 |
| 4,734,153 | A | * | 3/1988 | Kubo | 156/502 |
| 4,734,154 | A | * | 3/1988 | Kubo | 156/502 |
| 4,828,194 | A | * | 5/1989 | Kubo | 242/532.1 |
| 5,101,307 | A | * | 3/1992 | Mizuno et al. | 360/132 |
| 5,189,584 | A | * | 2/1993 | Mizuno et al. | 360/132 |
| 6,220,542 | B1 | * | 4/2001 | Titor | 242/615.3 |
| 6,302,344 | B1 | * | 10/2001 | Su | 242/347.1 |
| 6,883,740 | B2 | * | 4/2005 | Hiraguchi | 242/332.4 |
| 6,896,217 | B1 | * | 5/2005 | Ishikawa et al. | 242/348 |
| 2002/0179769 | A1 | * | 12/2002 | Dreckmann et al. | 242/527.3 |
| 2004/0135023 | A1 | * | 7/2004 | Bohm et al. | 242/527.2 |
| 2005/0105210 | A1 | * | 5/2005 | Okawa et al. | 360/93 |
| 2005/0127223 | A1 | * | 6/2005 | Ishikawa et al. | 242/338.1 |
| 2006/0032959 | A1 | * | 2/2006 | Hiraguchi et al. | 242/332.4 |
| 2007/0262188 | A1 | * | 11/2007 | Kubota | 242/532.2 |
| 2008/0237382 | A1 | * | 10/2008 | Shiga | 242/324.2 |
| 2008/0265077 | A1 | * | 10/2008 | Shiga | 242/348.3 |
| 2009/0283621 | A1 | * | 11/2009 | Suzuki | 242/532.2 |

FOREIGN PATENT DOCUMENTS

JP 2005-259273 9/2005

* cited by examiner

*Primary Examiner* — William A Rivera
(74) *Attorney, Agent, or Firm* — Solaris Intellectual Property Group, PLLC

(57) ABSTRACT

The invention provides a recording tape attaching method and a recording tape attaching apparatus for accurately attaching a recording tape to a reel hub. In the method and the apparatus for winding a recording tape around a hub of a reel, a hub is contacted with a recording tape retained by suction by a retaining member and rotated, thereby generating static electricity, and the recording tape is attached to the hub by attracting the recording tape to the hub by the generated static electricity.

12 Claims, 17 Drawing Sheets

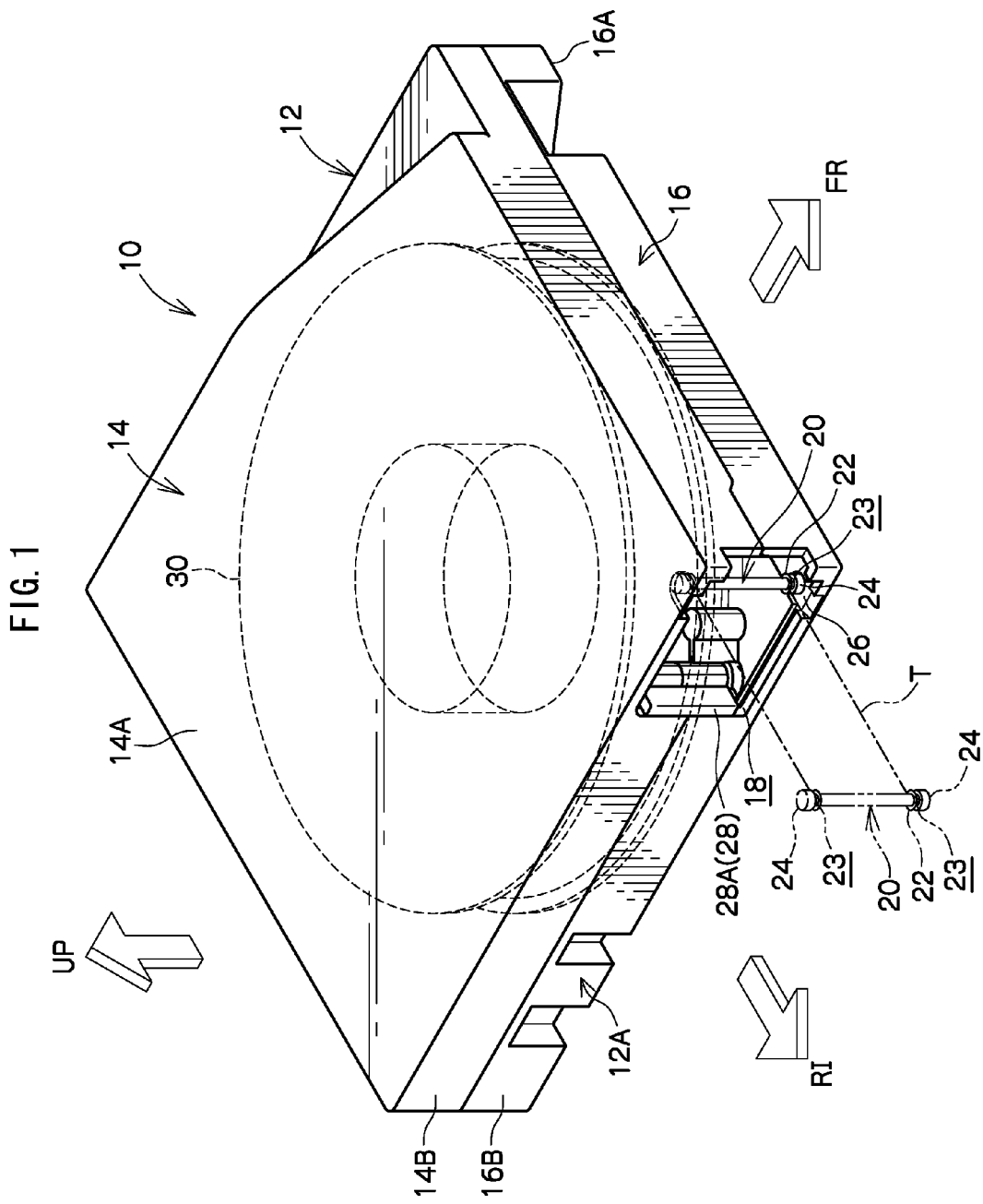

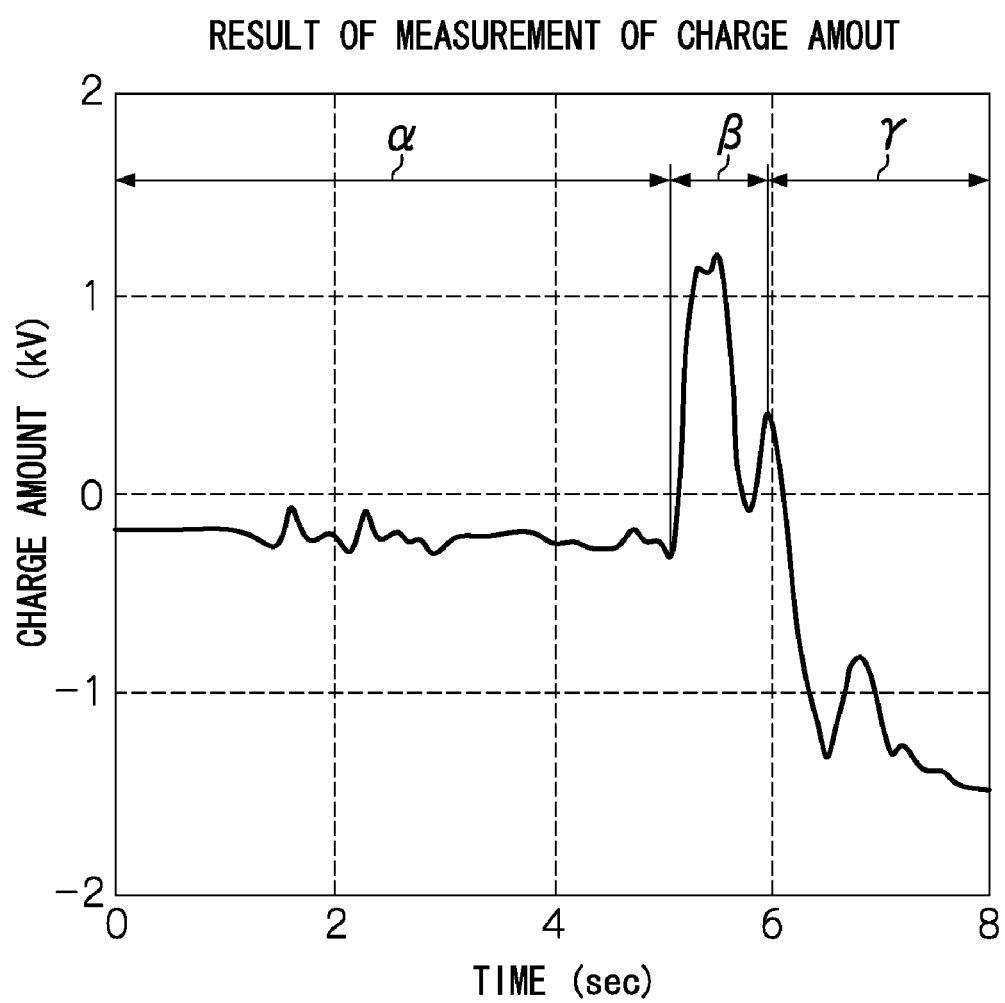

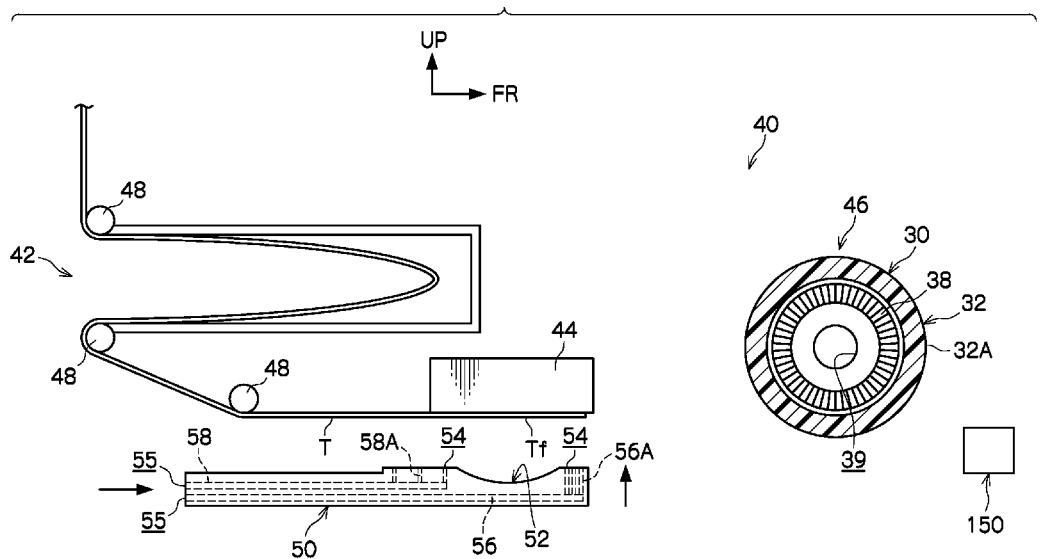

RECORDING TAPE ATTACHING METHOD AND RECORDING TAPE ATTACHING APPARATUS

CROSS-REFERENCE TO RELATED APPLICATION

This application claims priority under 35 USC 119 from Japanese Patent Application No. 2008-130827, the disclosure of which is incorporated by reference herein.

BACKGROUND OF THE INVENTION

1. Field of the Invention

The present invention relates to a recording tape attaching method and a recording tape attaching apparatus which attach a recording tape such as a magnetic tape or the like to a hub of a reel.

2. Related Art

A reel which is housed in a case and around which a recording tape such as a magnetic tape is wound is conventionally known. In such a reel, a free end portion of a recording tape is attached to an outer peripheral surface of a reel hub, and the recording tape is wound around the hub. Specifically, a liquid for attaching the recording tape, such as alcohol, is applied to the outer peripheral surface of the hub, and due to the surface tension of the liquid, the free end portion of the recording tape is attached to the outer peripheral surface of the hub, thereby allowing the recording tape to be wound around the hub (for example, see Japanese Patent Application Laid-Open (JP-A) No. 2005-259273).

However, in this method of attaching a recording tape, it is difficult to obtain a uniform drying speed of the liquid used for attaching the recording tape (alcohol or the like) in the height direction (axial direction) of the hub. As a result, when the free end portion of a recording tape is attached to an outer peripheral surface of the hub, and the recording tape starts to be wound around the hub while applying a predetermined tension thereto, the free end portion of the recording tape tends to incline in the height direction (axial direction) of the hub, and as a result the recording tape may be attached at an angle. If the recording tape is progressively wound around the hub in this state, an edge (an end portion in a width direction) of the recording tape may contact a flange and fold over.

SUMMARY OF THE INVENTION

In consideration of the above, the present invention aims to provide a recording tape attaching method and a recording tape attaching apparatus by which a recording tape can be accurately attached to a hub of a reel.

A first aspect of the present invention is a recording tape attaching method for winding a recording tape around a hub of a reel, the method including: contacting the hub with a contact member capable of generating static electricity by friction, and rotating the hub; and attaching the recording tape to the hub by attracting the recording tape to the hub by the generated static electricity.

In the invention of the first aspect, since a recording tape is attached to a hub by static electricity, distribution of force in an axial direction of the hub is uniform, and even if the recording tape starts to be wound while applying a predetermined tension thereto, the recording tape does not incline in an axial direction of the hub. In other words, as a result of the aspect of the present invention, a recording tape can be accurately attached to a hub.

A second aspect of the present invention is a recording tape attaching method for winding a recording tape around a hub of a reel, the method including: charging the hub positively by contacting the hub with a first contact member capable of generating static electricity by friction and rotating the hub; charging the recording tape negatively by contacting the recording tape with a second contact member capable of generating static electricity by friction and rubbing the recording tape; and attaching the recording tape to the hub by attracting the recording tape to the hub by the generated static electricity.

In the invention of the second aspect, since a recording tape is attached to a hub by static electricity, distribution of force in an axial direction of the hub is uniform, and even if the recording tape starts to be wound while applying a predetermined tension thereto, the recording tape does not incline in an axial direction of the hub. In other words, as a result of the aspect of the present invention, a recording tape can be accurately attached to a hub.

Further, in the second aspect of the invention, it is preferable that the first contact member is the recording tape and the second contact member is the hub.

A third aspect of the present invention is a recording tape attaching method for winding a recording tape around a hub of a reel, the method including: contacting the hub with the recoding tape which is retained at a retaining member by suction, and rotating the hub, thereby generating static electricity; and attaching the recording tape to the hub by attracting the recording tape to the hub by the generated static electricity.

In the invention of the third aspect, since a recording tape is attached to a hub by static electricity, distribution of force in an axial direction of the hub is uniform, and even if the recording tape starts to be wound while applying a predetermined tension thereto, the recording tape does not incline in an axial direction of the hub. In other words, as a result of the aspect of the present invention, a recording tape can be accurately attached to a hub.

A recording tape attaching method according to a fourth aspect of the present invention is the method according to the third aspect of the present invention, in which when passing the recording tape from the retaining member to the hub, suction by the retaining member stops, and air is blown from the retaining member towards the hub.

In the invention of the fourth aspect, it is possible to smoothly pass a recording tape from a retaining member to a hub, and to suppress problems that occur during passing.

A fifth aspect of the present invention is a recording tape attaching apparatus including: a rotation mechanism that rotates a hub of a reel; a retaining member that can retain a recording tape by suction and is movable; and a contact charge portion formed at the retaining member, for contacting the recording tape retained by suction at the retaining member to the hub.

In the invention of the fifth aspect, a recording tape is contacted with a hub, and the hub is rotated generating static electricity (by friction), and the recording tape is attached to the hub by the static electricity. Thereby, distribution of force in an axial direction of the hub is uniform, and even if the recording tape starts to be wound while applying a predetermined tension thereto, the recording tape does not incline in an axial direction of the hub. In other words, as a result of the aspect of the present invention, a recording tape can be accurately attached to a hub.

A recording tape attaching apparatus according to a sixth aspect of the present invention is the apparatus according to the fifth aspect of the present invention, in which the contact charge portion is formed in a recessed shape.

In the invention of the sixth aspect, a suitable contact area of the hub to the recording tape can be obtained.

A recording tape attaching apparatus according to a seventh aspect of the present invention is the apparatus according to the sixth aspect of the present invention, in which the contact charge portion has a curved surface with a curvature equal to or less than a curvature of the hub.

In the invention of the seventh aspect, a suitable contact area of the hub to the recording tape can be obtained in a favorable manner.

A recording tape attaching apparatus according to an eighth aspect of the present invention is the apparatus according to any one of the fifth aspect to the seventh aspect of the present invention, in which the retaining member attracts the recording tape by sucking air, and releases the recording tape by blowing air.

In the invention of the eighth aspect, it is possible to smoothly pass a recording tape from a retaining member to a hub, and to suppress problems that occur during passing.

Further, in the eighth aspect of the invention, it is preferable that the retaining member includes through holes through which sucked or blown air can pass.

Further, in the fifth aspect of the invention, it is preferable that the apparatus further includes a feeding mechanism that feeds the recording tape; and a temporary retaining member that temporarily retains the recoding tape fed by the feeding mechanism until passing the recording tape to the retaining member.

Further, in the sixth aspect of the invention, it is preferable that the contact charge portion has a bottom surface and inclined surfaces.

Thus, the present invention provides a recording tape attaching method and a recording tape attaching apparatus in which a recording tape can be accurately attached to a reel hub.

BRIEF DESCRIPTION OF THE DRAWINGS

Embodiments of the invention will be described in detail with reference to the following figures, wherein:

FIG. 1 is a schematic perspective view showing a recording tape cartridge.

FIG. 12 is a graph showing a result of a measurement of charge amount at an outer peripheral surface of a reel hub.

FIG. 15 is an explanatory view showing a process in which a retaining member retains a recording tape retained at a suction platform along with a contact member.

DETAILED DESCRIPTION OF THE INVENTION

Figure 2A:
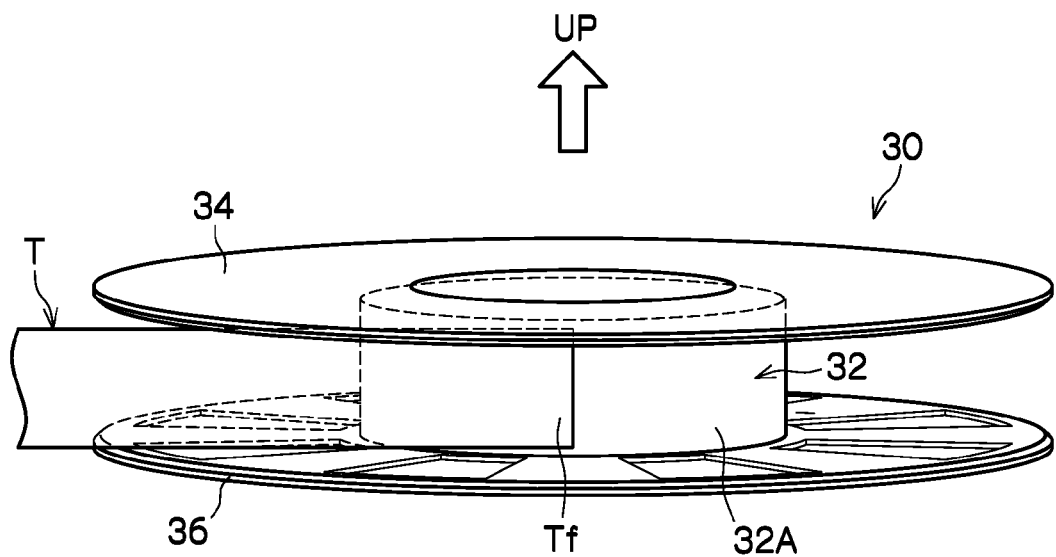
FIG. 2A is a schematic perspective view showing when a recording tape starts to be wound on a reel.

Preferred embodiments of the present invention will be explained below in detail with reference to the exemplary embodiments shown in the drawings. The method and apparatus for attaching a recording tape according to the present embodiments may be favorably used with respect to a reel 30 housed in a recording tape cartridge 10, and therefore explanation is made taking recording tape cartridge 10 as an example. However, the method and apparatus for attaching a recording tape according to the present embodiments may be used with any general reel 30 having a configuration in which a free end portion Tf of a recording tape T is be attached to an outer peripheral surface 32A of a reel hub 32 thereafter being is wound.

FIG. 1 is a schematic perspective view of the recording tape cartridge 10, and FIG. 2 is a schematic perspective view of the reel 30. First, a simple explanation of the recording tape cartridge 10 will be given. For ease of explanation, in the figures, arrow FR indicates a front direction, arrow UP indicates an up direction, and arrow RI indicates a right direction. In other words, when the FR, UP and RI arrows appear in any of the drawings, the directions indicated by these arrows indicate forward/back, up/down, and left/right directions, respectively.

As shown in FIG. 1, the recording tape cartridge 10 includes a substantially rectangle box-shaped case 12, including an upper case 14 and a lower case 16 each made of resin, a top plate 14A and a peripheral wall 14B that projects from the periphery thereof, a bottom plate 16A and a peripheral wall 16B that projects from the periphery thereof, the peripheral wall 14B and the peripheral wall 16B being in mutual contact and joined together by screws or the like.

At an inner portion of the case 12, a single reel 30 made of resin is rotatably housed. As shown in FIG. 2A, the reel 30 includes a reel hub 32 having a circular tube shape with a base, which forms the center of rotation of the reel 30, a lower flange 36 provided at an upper end portion thereof, and an upper flange 34 provided at an upper end portion thereof. As an information recording and playback medium, a recording tape such as a magnetic tape is wound around an outer peripheral surface 32A of the reel hub 32, and end portions in a width direction of the wound recording tape are retained by the upper flange 34 and the lower flange 36.

At a lower surface of a base wall of the reel hub 32 is formed a circular reel gear (not shown), and a circular reel plate (not shown) made of magnetic material is integrally fixed at an inner side in a radial direction of the reel gear by insert molding or the like. At an inner side in a radial direction of the inner plate is a through hole 39 (see FIGS. 4-9), for the operation of a brake portion explained below.

At approximately a center portion of the lower case 16 is a gear opening (not shown) which exposes the reel gear and reel plate to an outside portion. The reel gear exposed by the gear opening engages a drive gear (not shown) formed at a rotation shaft (not shown) of a drive apparatus, and is rotationally driven such that the reel 30 may rotate inside the case 12 and relative to the case 12.

At an upper surface of the base wall of the reel hub 32 is a circular engagement gear 38 (see FIGS. 4-9), which, when not in use (when the cartridge not loaded in a drive apparatus), engages with a brake gear of a brake member (not shown) which cannot rotate with respect to the case 12 (the upper case 14). In other words, when the circular engagement gear 38 is not in use, the brake gear of the brake member engages with the engagement gear 38, thereby preventing the reel 30 from rotating inadvertently with respect to the case 12.

At a right wall 12a of the case 12 is formed an opening 18 for pulling out the recording tape T wound around the reel 30. At a free end portion of the recording tape T pulled out from the opening 18 is fixed a leader pin 20 which is caught (engaged) by a pulling-out member (not shown) of the drive apparatus and pulled out.

Thick plate-shaped large flanges 24 are integrally provided at respective ends in an axial direction of the leader pin 20, and thin plate-shaped small flanges 22 are integrally provided at respective inner sides in an axial direction of each of the large flanges 24, and respectively separated from the large flanges 24 by predetermined gaps. The free end portion of the recording tape T is fixed between the small flanges 22, and spaces between each of the small flanges 22 and the large flanges 24 are rounded grooves 23 which are engaged by hook or the like of a pulling-out portion of the drive apparatus At inner side of the opening 18 of the case 12, namely, at the inner surface of the top plate 14A of the upper case 14 and at the inner surface of the bottom plate 16A of the lower case 16, are provided a pair of upper and lower pin retaining portions 26 that retain and fix the position of the leader pin 20 in the case 12. The pin retaining portions 26 are substantially semi-circular and open towards a side at which the recording tape T is pulled out, such that when the leader pin 20 is upright, the large flanges 24 of the leader pin 20 may be inserted into or pulled out of the respective pin retaining portions 26 from the open sides thereof.

A plate spring (not shown) is fixed in the vicinity of the pin retaining portions 26, and has a forked front end portion which engages with each large flange 24 of the leader pin 20 thereby the retaining leader pin 20 at the pin retaining portions 26. When the leader pin 20 is inserted into or pulled out of the pin retaining portions 26, the front end portions of the plate spring appropriately elastically deform to allow movement of the leader pin 20.

The opening 18 may be opened and closed by a door 28. The door 28 is substantially square and plate shaped, and large enough to cover the opening 18, and is biased in a direction in which it closes the opening 18 by a biasing member (not shown). At a front end portion of the door 28, a projection portion 28A for opening and closing projects towards the outside. When the recording tape cartridge 10 is loaded into a drive apparatus, the projection portion 28A, engages with an opening and closing member (not shown) of the drive apparatus, and thereby the door 28 is made to resist the biasing force of the biasing member, and opens.

Figure 2B:
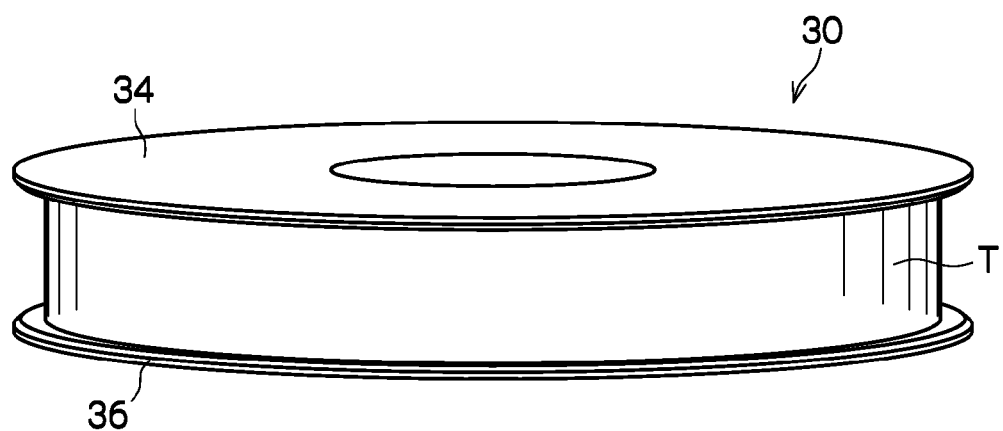
FIG. 2B is a schematic perspective view showing when winding of a recording tape on a reel is finished.

As shown in FIG. 2B, the recording tape T is wound around the reel 30 in the recording tape cartridge 10 having the above-described configuration. As shown in FIG. 2A, the free end portion Tf of the recording tape T (the free end portion opposite to the free end portion at which the leader pin 20 is attached) is attached at an outer peripheral surface 32A of the reel hub 32, and by rotating the reel 30, the recording tape T is progressively wound around the reel hub 32. Next, a winding apparatus 40, which winds the recording tape T around the reel hub 32 will be described.

Figure 3:
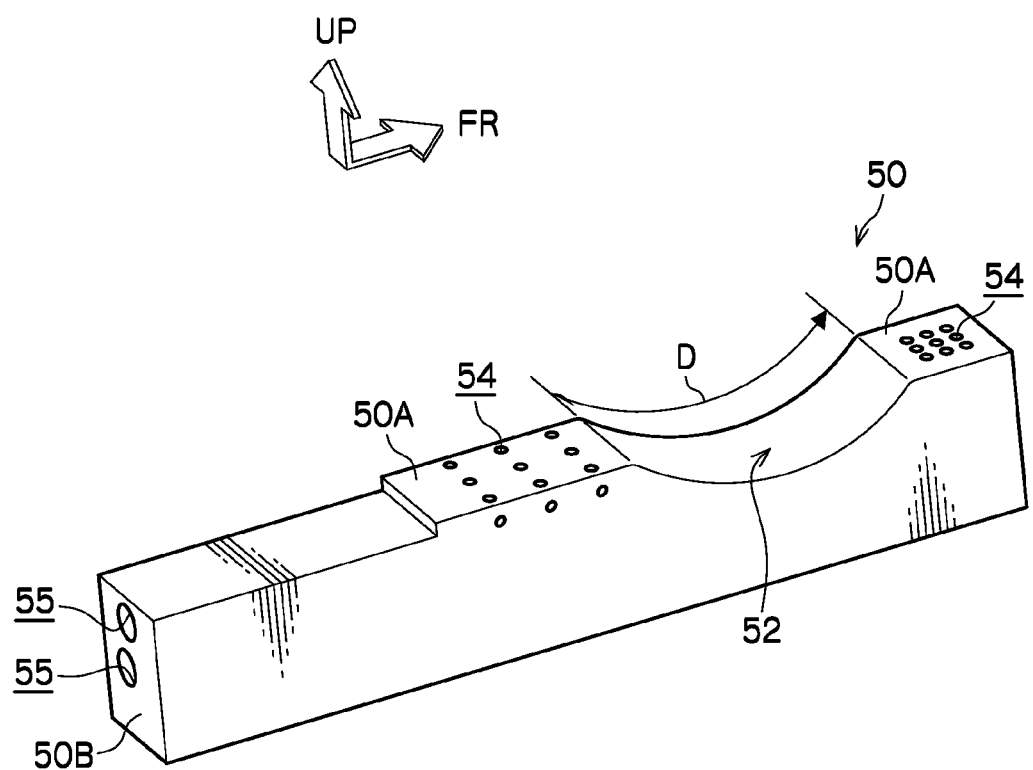
FIG. 3 is a schematic perspective view showing a retaining member provided at a winding apparatus.
Figure 8:
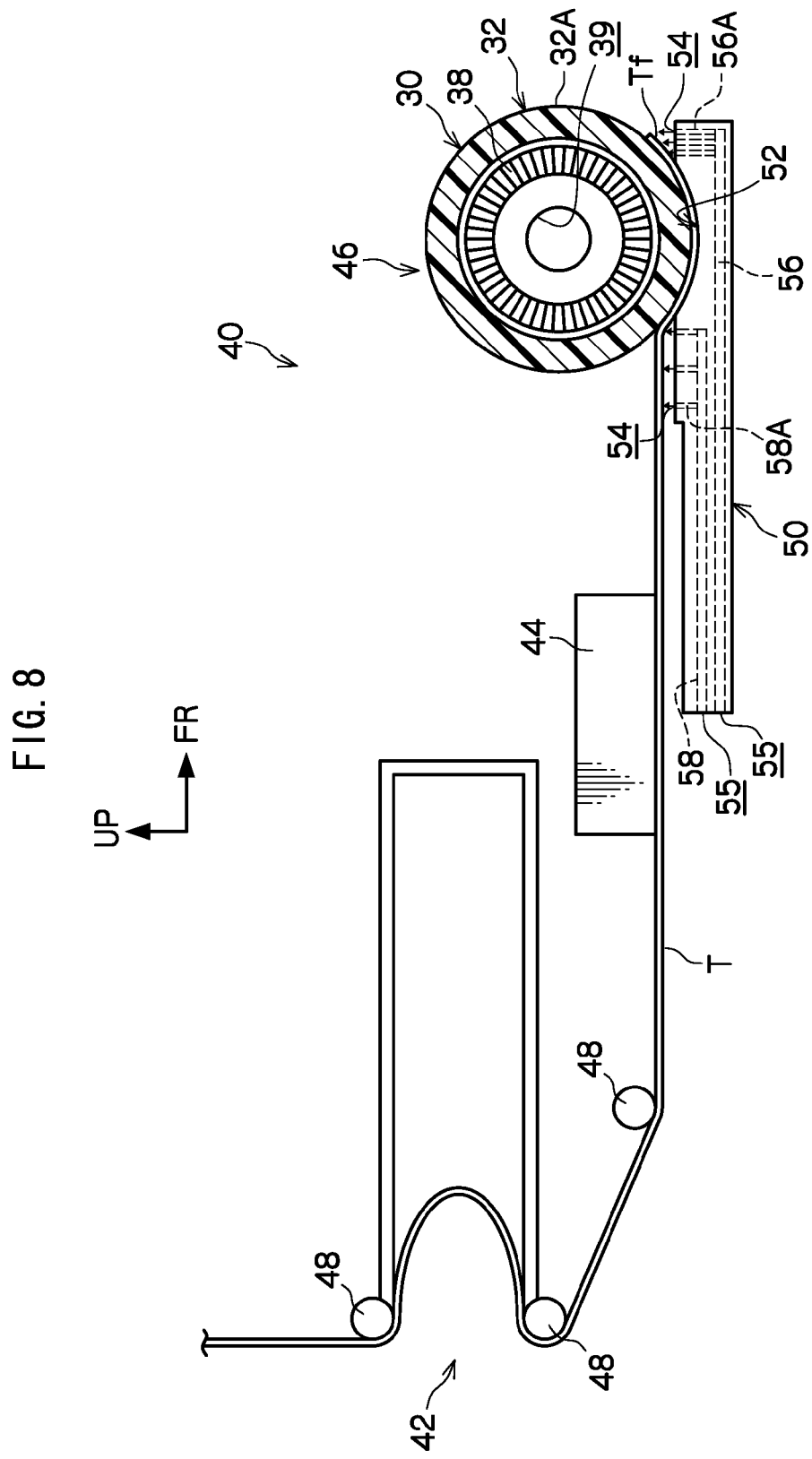
FIG. 8 is an explanatory view showing a process in which air is blown from a retaining member to attach a recording tape to a reel hub.
Figure 9A:
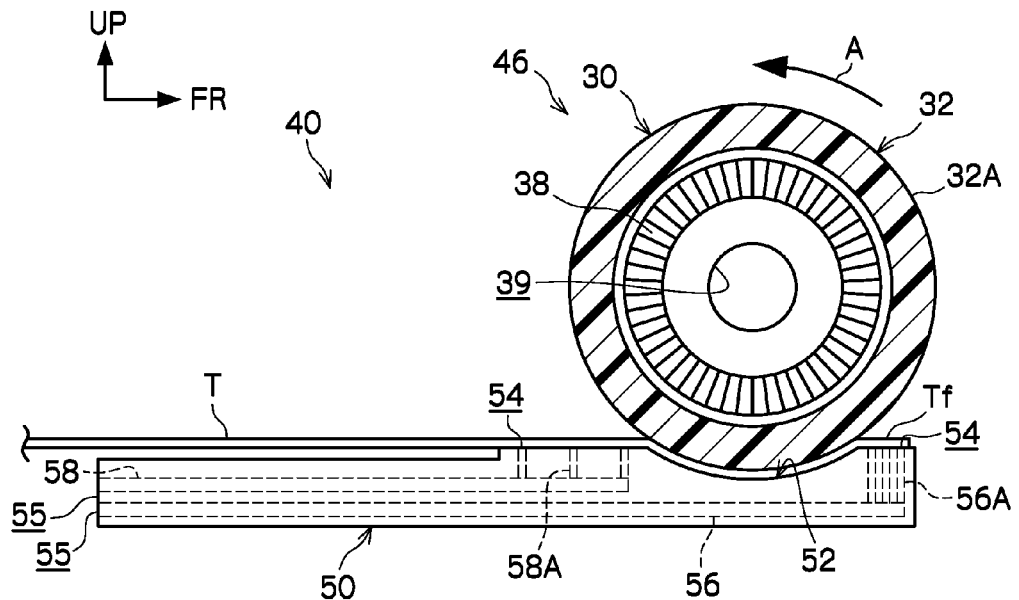
FIG. 9A is an enlarged explanatory view showing a process in which a reel hub, to which a recording tape retained by a retaining member is pressed, is rotated
Figure 9B:
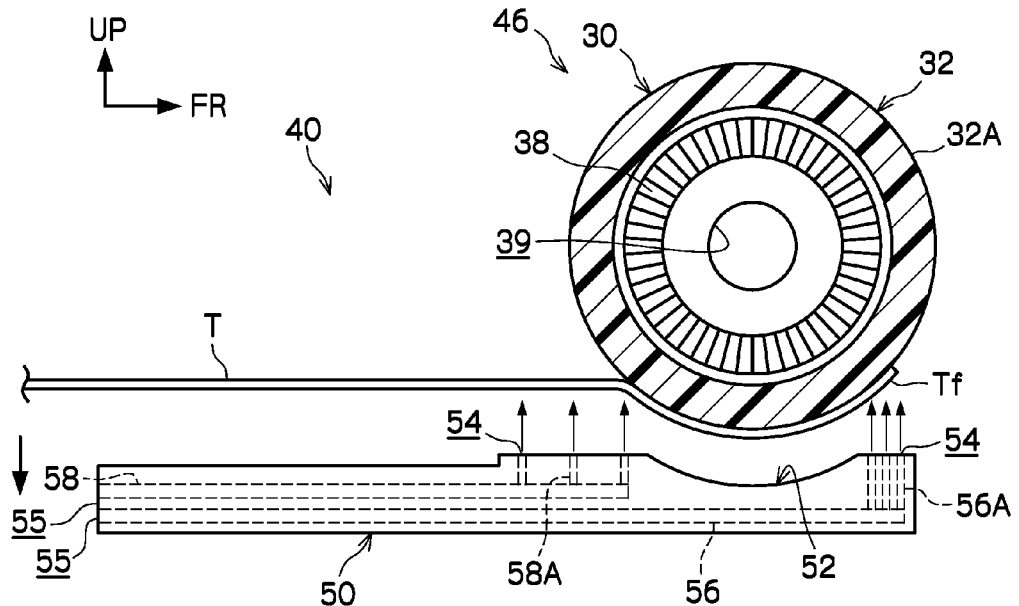
FIG. 9B is an enlarged explanatory view showing a process in which a retaining member, which has attached a recording tape to a reel hub, is separated from the reel hub.

FIG. 3 is a schematic perspective view of a retaining member 50 which is provided to a winding apparatus 40. FIGS. 4-8 are explanatory views of a process in which the recording tape T is attached to the outer peripheral surface 32A of the reel hub 32. FIGS. 9A and 9B are enlarged explanatory views of a process in which the recording tape T is passed from the retaining member 50 to the reel hub 32.

As shown in FIGS. 4-8, the winding apparatus 40 is provided with a feeding mechanism 42 of the recording tape T, a suction platform 44 which temporarily retains the free end portion Tf of the recording tape T by suction, a rotation mechanism 46 which retains and rotates reel 30, and the retaining member 50 which retains free end portion Tf of recording tape T by suction, and moves free end portion Tf. Further, in order to simplify FIGS. 4-9, only reel hub 32 of reel 30 is indicated in sectional view.

The feeding mechanism 42 is provided with plural guide rollers 48 that guide the recording tape T. At a lower surface of the suction platform 44, plural (many) through holes (not shown) are formed, and an air suction apparatus (not shown) is connected in communication manner via a tube (not shown) to each of the through holes. Air is sucked through each of the through holes by the air suction apparatus, thereby retaining the recording tape T at the lower surface of the suction platform 44 by suction.

A circular rotation drive gear (not shown) is provided in circular manner at rotation mechanism 46, and at a radial direction inner side thereof, a magnet (not shown) that rotates together with the rotation drive gear is provided. A reel gear formed at a lower surface of the base wall of the reel hub 32 engages with the rotation drive gear, the reel plate is attracted by the magnet, and reel hub 32 rotates while being retained by the rotation mechanism 46.

The retaining member 50, which is configured to be able to retain the recording tape T by suction and is movable, is provided under the suction platform 44. As shown in FIG. 3, the retaining member 50 has a long, thin, substantially rectangular box shape, an inner portion of which is hollow. At an upper surface 50A at a front end vicinity of the retaining member 50 (a vicinity farther to a front end side than the center thereof in a length direction), is a recessed portion 52 which is a contact charging portion for contacting (pressing) the recording tape T to the reel hub 32.

The recessed portion 52 is a curved surface that has a substantially arc shape when viewed from the side, having a curvature equal to or less than that of the reel hub 32. Specifically, supposing a curvature radius R1 of the reel hub 32 to be 22.0 mm, a curvature radius R2 of the recessed portion 52 is 0.1 mm larger than it, that is, 22.1 mm. A width D of the recessed portion 52 (a length in a circumferential direction) is, for example, 32 mm.

Width D of the recessed portion 52 is preferably as large as possible, since a contact area of the outer peripheral surface 32A of the reel hub 32 with the recording tape T may be increased accordingly; however, the height of the retaining member 50 must also increase accordingly. Therefore, in a case of a winding apparatus in which the reel 30 is fitted into the case 12 of the recording tape cartridge 10 thereafter the recording tape T is wound around the reel hub 32, since it is necessary for the retaining member 50 to be inserted from the opening 18, the height (maximum height) of the retaining member 50 is restricted.

In this case, a width D of the recessed portion 52 which is approximately half of the above value (i.e. D=16 mm), is sufficient, if, for example, the period of time over which the outer peripheral surface 32A of the reel hub 32 is in sliding contact (rubs) with the free end portion Tf of the recording tape T, and the pressure at which the retaining member 50 is pressed against the outer peripheral surface 32A of the reel hub 32, and the like, are appropriately adjusted. Further, at predetermined positions of the upper surface 50A at both sides of the recessed portion 52 (a front end side and a rear end side), plural (many) through holes 54 are formed.

As shown in FIGS. 4-8, the through holes 54 which are formed at the front end side of the recessed portion 52 and the through holes 54 which are formed at the rear end side of the recessed portion 52 are connected in communication manner respectively to plural communication portions 56A provided at one end of a front end tube 56 and plural communication portions 58A provided at one end of a rear end tube 58. Other end portions of the front end tube 56 and the rear end tube 58, are connected in communication manner to an air suction/supply apparatus (not shown), via through holes 55 formed in a rear end wall surface 50B of the retaining member 50, as shown in FIG. 3.

When air is sucked by the air suction/supply apparatus, air is sucked through the respective through holes 54, and the recording tape T is retained by suction at the upper surface 50A of the retaining member 50. When air is supplied by the air suction/supply apparatus, air is blown from the respective through holes 54, and the recording tape T is released and blown from the upper surface 50A of the retaining member 50, which will be mentioned later.

The retaining member 50 is configured to be able to move forward (in the direction of arrow FR), backward (in a direction opposite to the direction of arrow FR), up (in the direction of arrow UP) and down (in a direction opposite to the direction of arrow UP), by a movement mechanism such as a linear guide or the like not shown in the drawings. In other words, the retaining member 50 can move to approach (access) to or to be apart from the reel hub 32 while retaining the recording tape T by suction, and thereby the recessed portion 52 thereof can be contacted with (pressed to) the reel hub 32 or separated from the reel hub 32.

Figure 4:
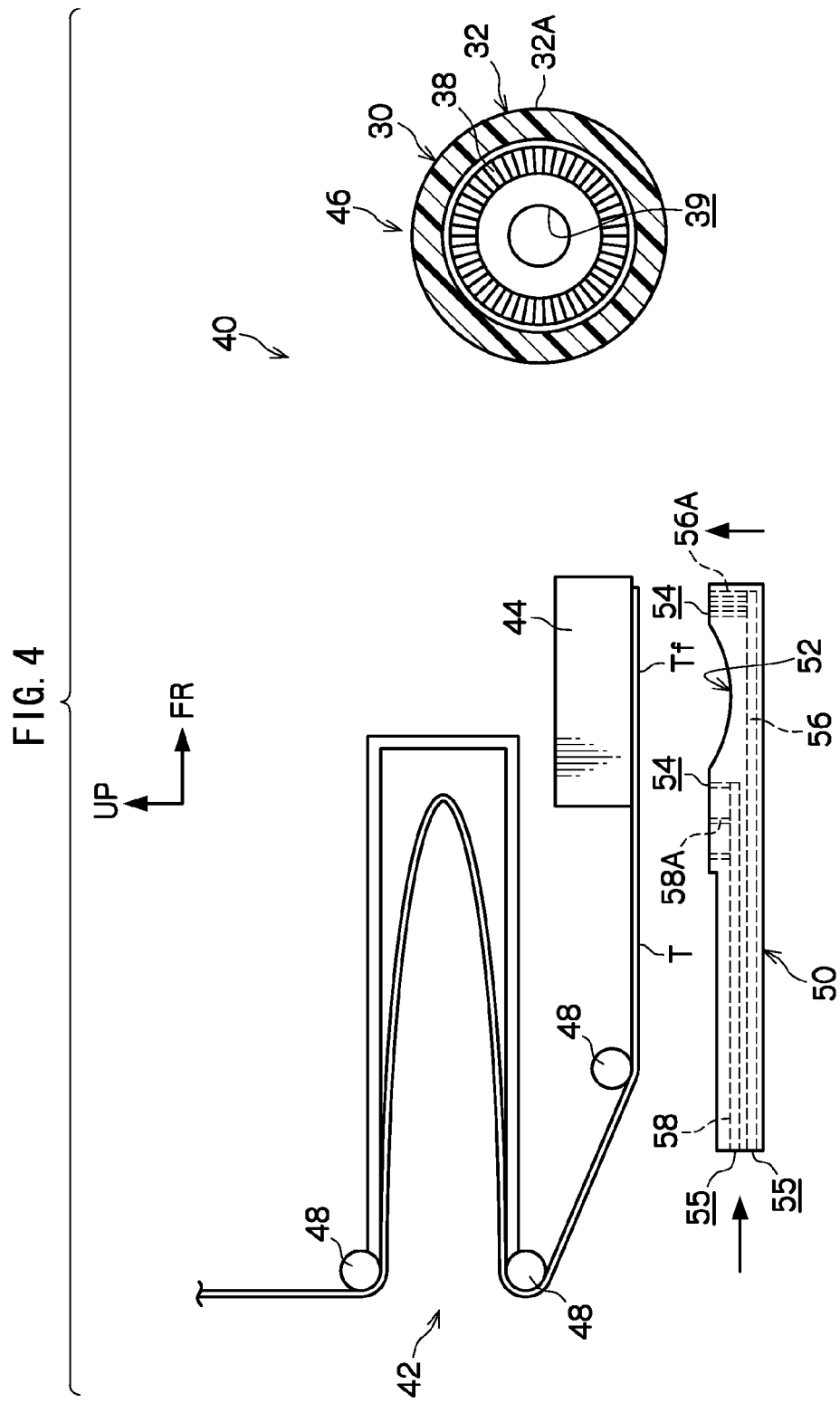
FIG. 4 is an explanatory view showing a process in which a retaining member retains a recording tape retained at a suction platform.

The operation of the winding apparatus 40 and the retaining member 50 having the above configuration is explained in the following with reference to FIGS. 4-9. As shown in FIG. 4, the free end portion Tf of the recording tape T, which is fed via the guide rollers 48 by the feeding mechanism 42, is held by suction by the suction platform 44. Specifically, air is sucked through each of the through holes by the air suction apparatus, therefore the free end portion Tf of the recording tape T is temporarily held by suction at a lower surface of the suction platform 44.

Meanwhile, the reel 30 is set at the rotation mechanism 46. Specifically, the reel gear formed at the lower surface of the base wall of the reel hub 32 engages with the drive rotation gear, and the reel plate is attracted to the magnet. Further, the retaining member 50 moves forward to a standby position under the suction platform 44.

Figure 5:
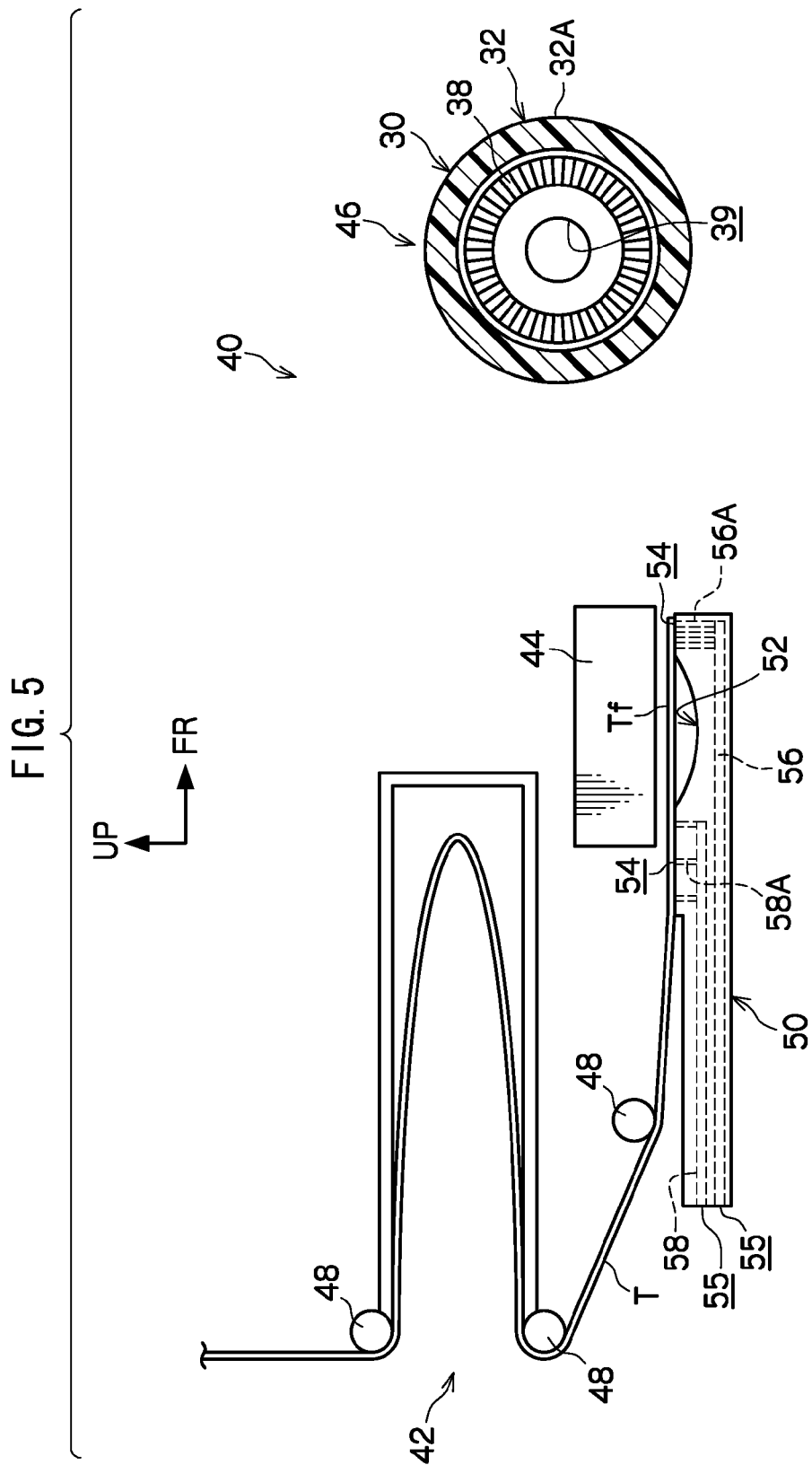
FIG. 5 is an explanatory view showing a process in which a retaining member retains a recording tape previously retained at a suction platform.

Then, in this state, a process of winding the recording tape T begins. First, as shown in FIG. 4, the retaining member 50 moves upwards. Then, as shown in FIG. 5, the free end portion Tf of the recording tape T, which is held by suction at the suction platform 44, is held by suction by the retaining member 50, from a lower surface side of the suction platform 44. Specifically, air is sucked through the through holes 54 by the air suction/supply apparatus, and thereby the free end portion Tf of the recording tape T comes to be held by suction at the upper surface 50A of the retaining member 50.

When the retaining member 50 applies suction to the free end portion Tf of the recording tape T, the air suction apparatus that connects to and communicates with the suction platform 44 ceases operating, and the air suction apparatus no longer applies suction to the recording tape T (suction by the suction platform 44 with respect to the recording tape T is cancelled. It is also possible that another air suction/supply apparatus is connected to and communicates with the suction platform 44 so as to blow air through the through holes of the suction platform 44 when the free end portion Tf of the recording tape T is passed to the retaining member 50, and as a result the passing operation may be performed quickly.

Figure 6:
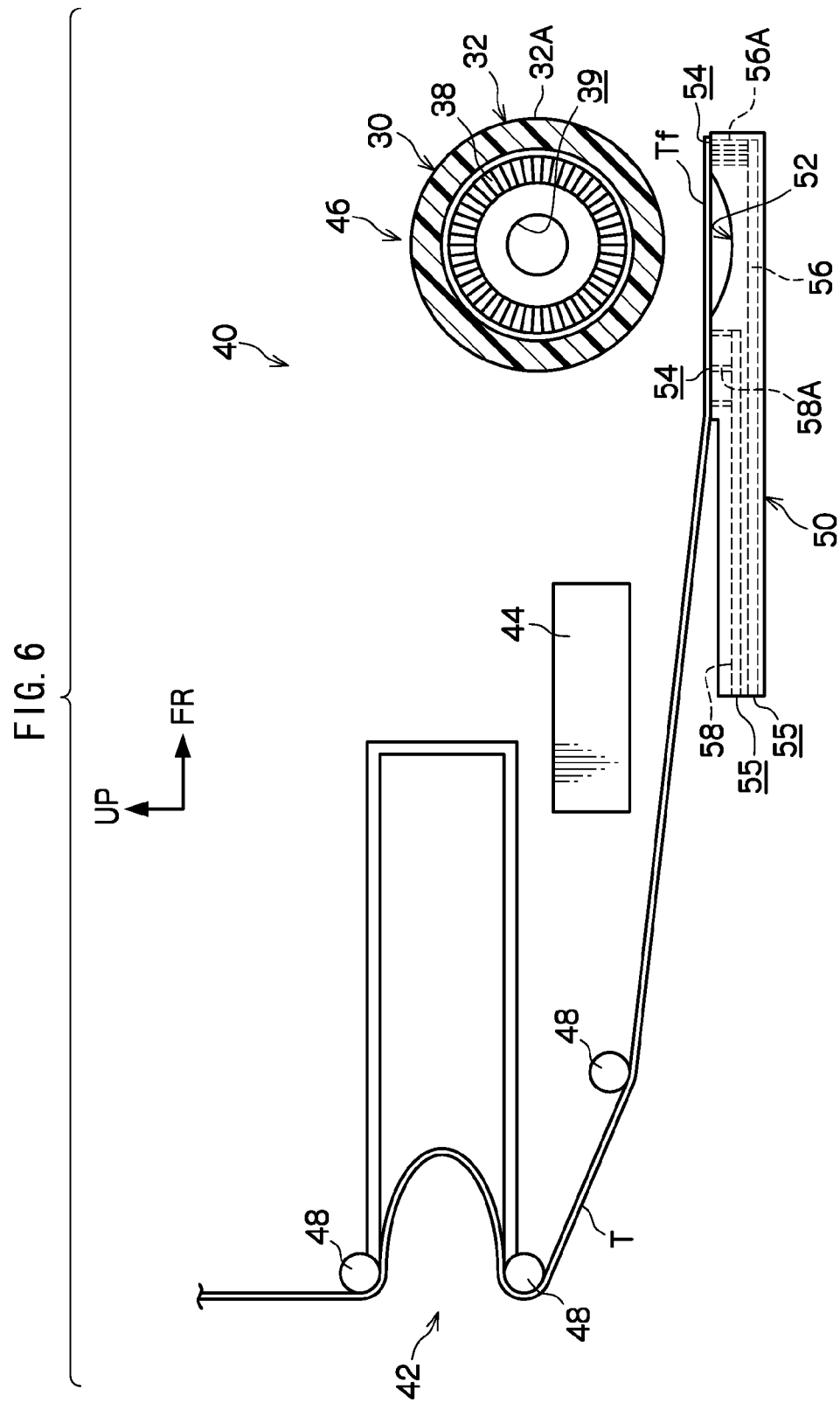
FIG. 6 is an explanatory view showing a process in which a retaining member retaining a recording tape moves towards a reel hub.

As shown in FIG. 5, the retaining member 50, at which the free end portion Tf of the recording tape T is held at the upper surface 50A thereof, moves down slightly to separate from the suction platform 44. Then, as shown in FIG. 6, the retaining member 50 moves forward to a predetermined position directly under the reel hub 32. Then, as shown in FIG. 7, the retaining member 50, which is positioned directly under the reel hub 32, moves upwards, and the recessed portion 52 of the retaining member 50 is made to contact the outer peripheral surface 32A of the reel hub 32 at a predetermined pressure (for example, 0.4 MPa).

That is, the free end portion Tf of the recording tape T, which is positioned on the recessed portion 52, is pressed (contacted with pressure) to the outer peripheral surface 32A of the reel hub 32 at a predetermined pressure (for example, 0.4 MPa). At this time, since the recessed portion 52 has a substantially arc shape in the side view with a curvature equal to or less than that of the reel hub 32, a favorable contact surface area can be obtained between the recording tape T and the outer peripheral surface 32A of the reel hub 32.

Figure 7:
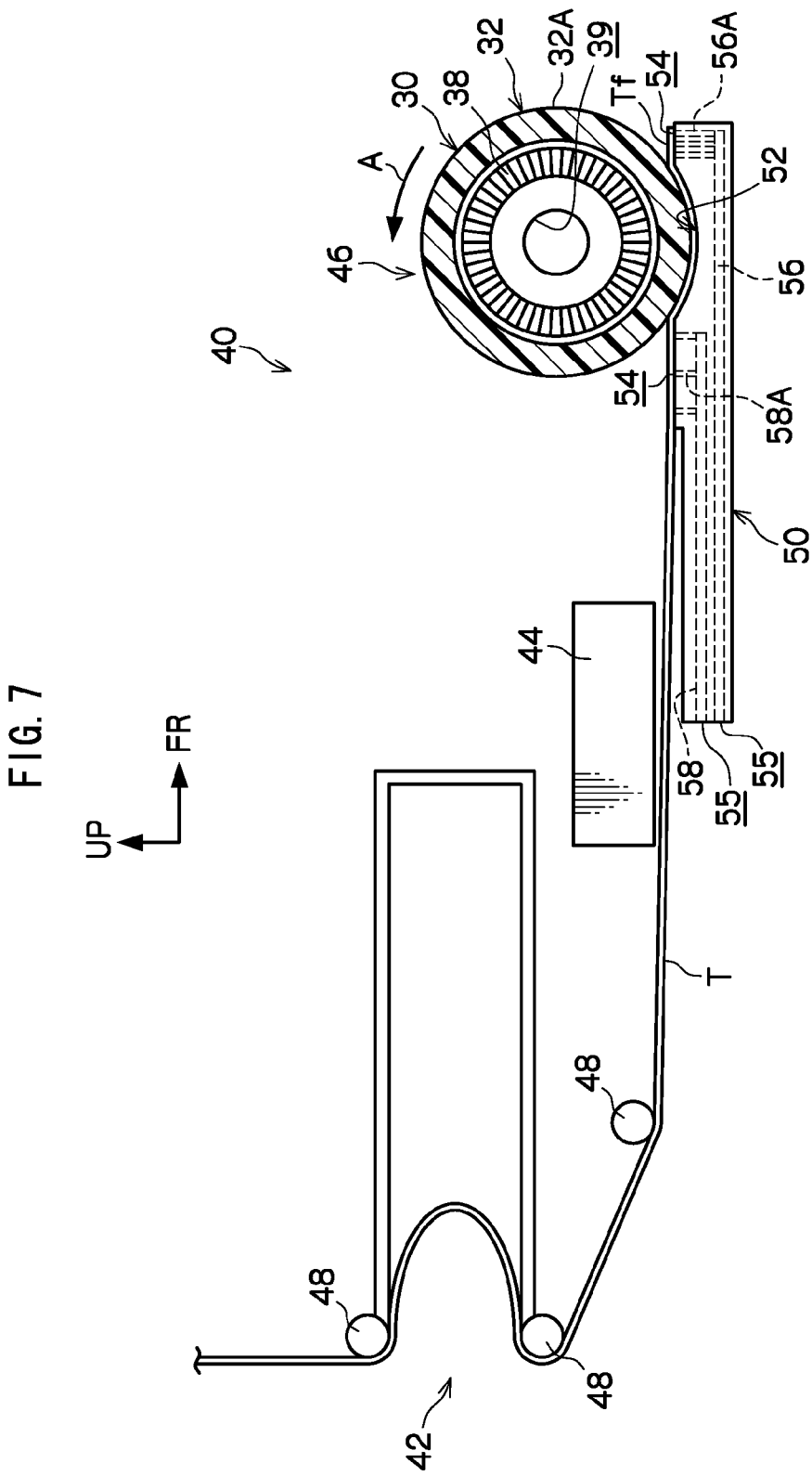
FIG. 7 is an explanatory view showing a process in which a reel hub, to which a recording tape retained by a retaining member is pressed, is rotated.

Subsequently, as shown in FIGS. 7 and 9(A), the reel hub 32 rotates in a counterclockwise direction (indicated by arrow A in the drawings) at a predetermined speed (approximately 1 rotation per second). That is, the rotation drive gear rotates at a predetermined speed (approximately 1 rotation per second) in the direction of arrow A, thereby the reel hub 32 rotates in approximately 2 seconds in the direction of arrow A at a predetermined speed (approximately 1 rotation per second).

Thereby, due to friction (sliding contact) between the outer peripheral surface 32A of the reel hub 32 and the recording tape T, static electricity is generated, and the outer peripheral surface 32A of the reel hub 32 becomes positively charged (for example by +1 kV, indicated in FIG. 12 by β), while the recording tape T becomes negatively charged (for example by −1 kV, indicated in FIG. 12 by γ). The respective charge amounts may be obtained through measurement by a static electricity sensor 60 at a position separated from the outer peripheral surface 32A of the reel 30 in a radial direction by a distance H of, for example, 25 mm, as shown in FIGS. 11A, 11B and 11C.

Figure 11A:
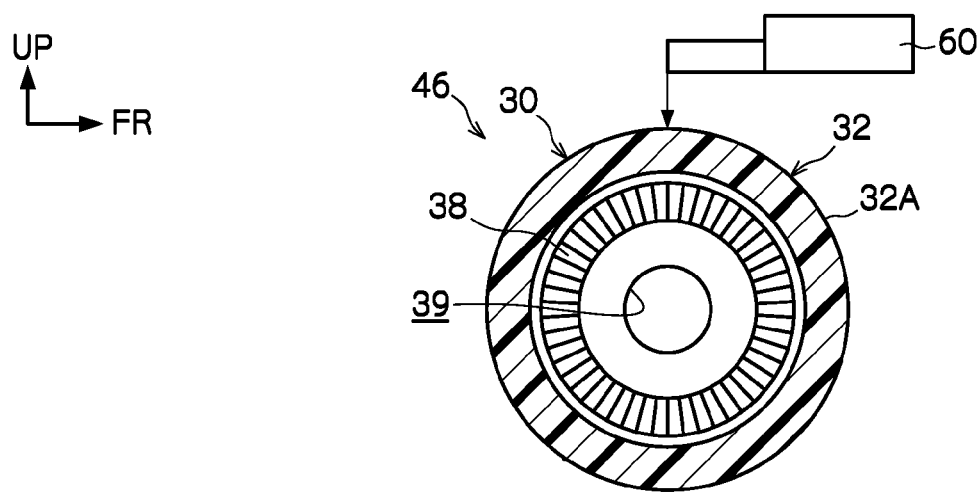
FIGS. 11A, 11B and 11C are explanatory views showing a method of measuring a charge amount at an outer peripheral surface of a reel hub.
Figure 11B:
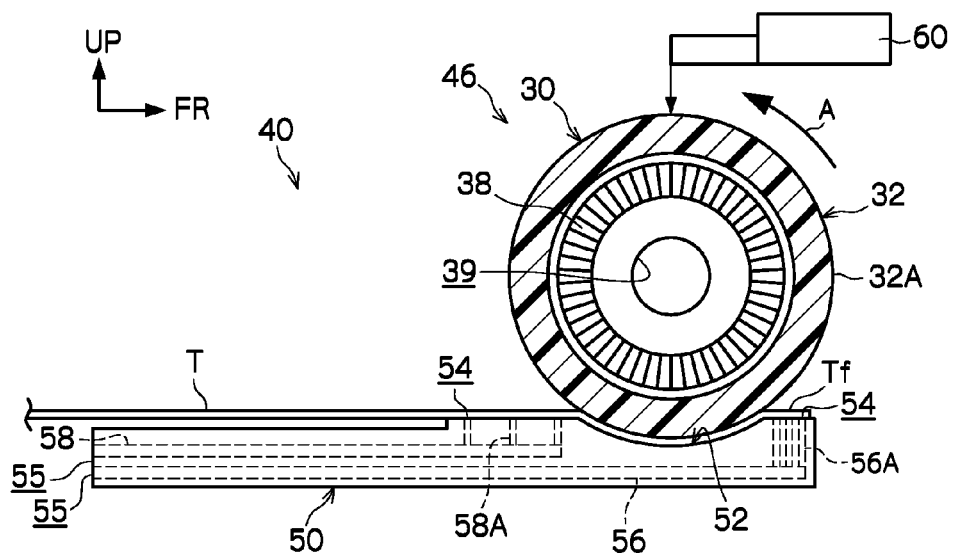

Before the reel hub 32 is rotated (before contact with the recording tape T), and while it is in the state shown in FIG. 11A, a charge amount at the outer peripheral surface 32A of the reel hub 32 is substantially ±0 kV, as shown by a region α in FIG. 12. When, as shown in FIG. 11B, the recording tape T contacts the outer peripheral surface 32A of the reel hub 32 and the reel hub 32 is rotated, a charge amount at the outer peripheral surface 32A of the reel hub 32 becomes substantially +1 kV, as shown by a region β in FIG. 12.

Figure 11C:
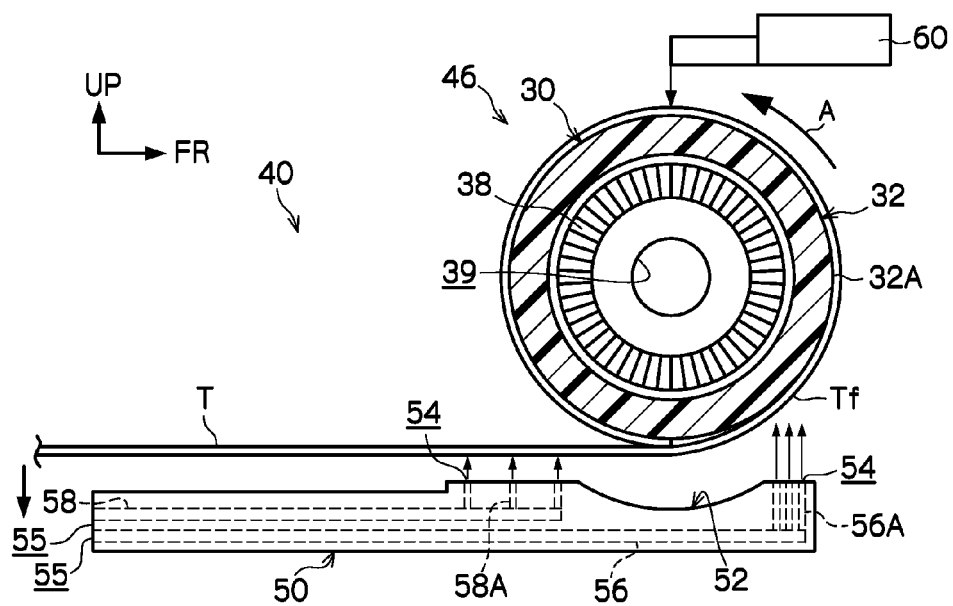

When, as shown in FIG. 11C, the recording tape T is attached to the outer peripheral surface 32A of the reel hub 32 and wound around the reel hub 32 at least once, a charge amount of the recording tape T is −1 kV, as shown by a region γ in FIG. 12. Thus, the reel hub 32 (the outer peripheral surface 32A) is charged to approximately +1 kV, and the recording tape T is charged to about −1 kV. A charge amount of approximately 1 kV is sufficient, although the charge amount will depend on the contact surface area between the outer peripheral surface 32A of the reel hub 32 and the recording tape T.

Figure 10:
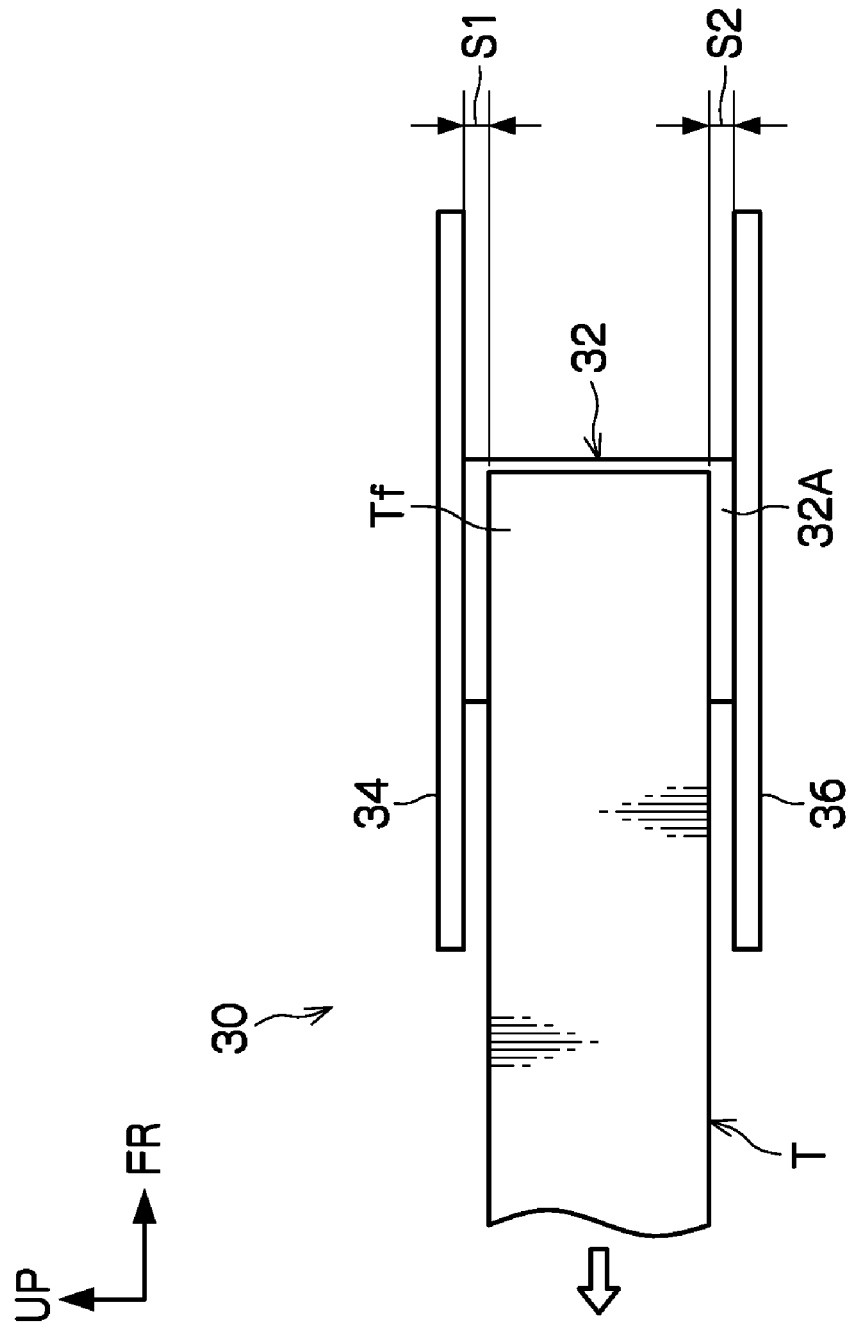
FIG. 10 is a schematic side view showing a recording tape attached to a reel hub by static electricity.

When the outer peripheral surface 32A of the reel 30 has been positively charged to approximately +1 kV and the recording tape T has been negatively charged to approximately −1 kV, the air suction/supply apparatus supplies air, and blows air from the through holes 54 of the retaining member 50. Thereby, as shown in FIG. 8, the free end portion Tf of the recording tape T is attracted by static electricity to the outer peripheral surface 32A of the reel 30. This state is shown in FIG. 10.

When air is blown through the through holes 54 of the retaining member 50, since it is possible to smoothly pass the recording tape T from the retaining member 50 to the reel hub 32, faults in the passing operation or the like do not occur. Thus, the free end portion Tf of the recording tape T is attracted to the outer peripheral surface 32A of the reel hub 32 by static electricity, and the free end portion Tf can be attached to the outer peripheral surface 32A of the reel hub 32 accurately (such that a length direction of the recording tape T is a direction perpendicular to an axial direction of the reel hub 32).

Figure 14A:
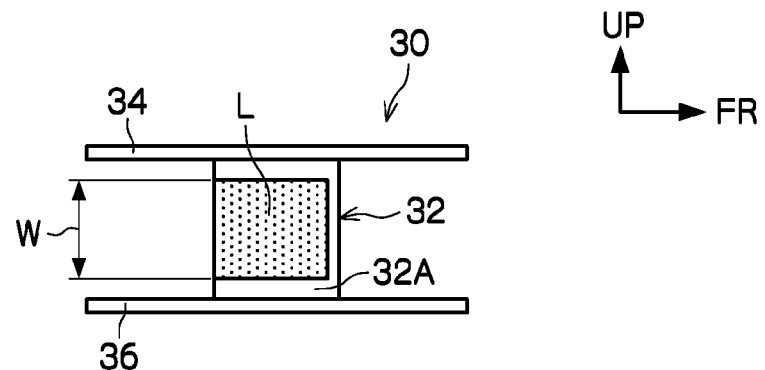
FIGS. 14A, 14B, 14C and 14D are schematic side views of a comparative example in which a recording tape is attached to a reel hub by alcohol.

As shown by the comparative example shown in FIG. 14A, in a method in which alcohol L, as a liquid for attaching the recording tape T to the outer peripheral surface 32A of the reel 30, is applied across a predetermined width W (refer to FIG. 14A), and the free end portion Tf of the recording tape T is attached therewith, since a drying speed of the alcohol L is uneven in a height direction (axial direction) of the reel hub 32, it is difficult to attach the recording tape T accurately (difficult to attach it such that a length direction of the recording tape T is a direction perpendicular to an axial direction of the reel hub 32).

Figure 14B:
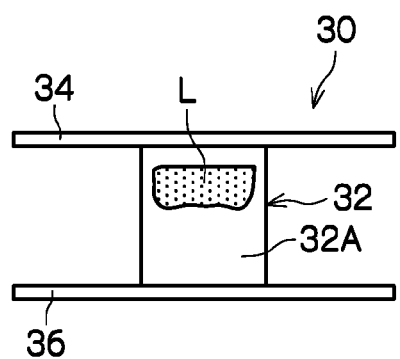
Figure 14C:
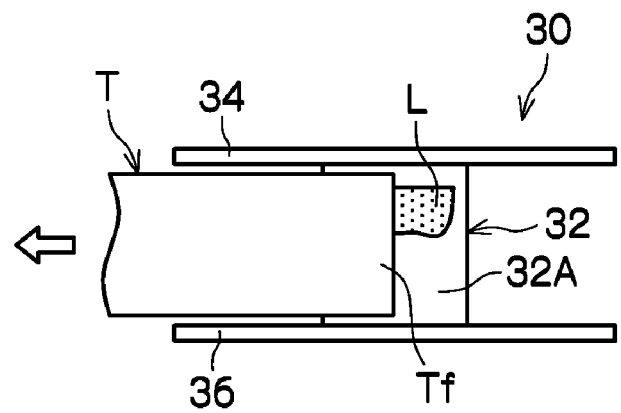

Explaining concretely, as shown in FIGS. 14B and 14C, suppose that the free end portion Tf of the recording tape T is to be attached to a portion to which the alcohol L has been applied, and approximately half of the alcohol L dries at a lower flange 36 side, while approximately half of the alcohol L remains at an upper flange 34 side. In this case, a certain amount of tension is applied to the recording tape T while it is wound around the reel hub 32, and the free end portion Tf of the recording tape T is held at a region where it is attached, and, as a result, the free end portion Tf of the recording tape T inclines towards the upper flange 34 side (an axial direction of the reel hub 32).

Figure 14D:
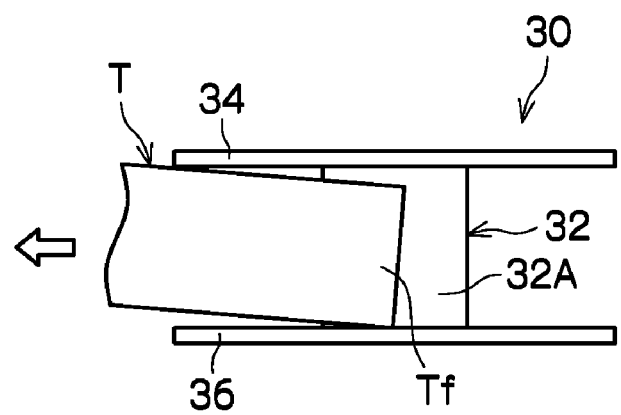

As shown in FIG. 14D, the free end portion Tf of the recording tape T is attached inclined from a direction perpendicular to an axial direction of the reel hub 32, and when the recording tape T is wound around the reel hub 32 in this state, an edge (width direction end portion) of the recording tape T contacts the upper flange 34 and folds over. This phenomenon is particularly prominent when the space between the upper flange 34 and the lower flange 36 is small (for example, 12.67 mm), or when the recording tape T is reduced in thickness (to, for example 6.6 μm) in order to increase recording storage capacity.

In a configuration in which a liquid for attaching a recording tape is applied to the outer peripheral surface 32A of the reel hub 32, and the free end portion Tf of the recording tape T is attached thereto, particularly, when the recording tape T is thinner than a conventional recording tape, it is difficult to accurately attach the free end portion Tf to the outer peripheral surface 32A of the reel hub 32 (difficult to attach it such that a length direction of the recording tape T is a direction perpendicular to an axial direction of the reel hub 32).

However, in the present embodiment, a liquid for attaching a recording tape is not used, and the free end portion Tf of the recording tape T is attached to the outer peripheral surface 32A of the reel hub 32 by static electricity. As a result, distribution of force in a height direction of the reel hub 32 (axial direction) is even, and the recording tape T can be attached accurately (such that a length direction of the recording tape T is a direction perpendicular to an axial direction of the reel hub 32). That is, as shown in FIG. 10, it is possible to attach the recording tape T such that constant gaps S1 and S2 are formed between the edges of the recording tape T and each of the upper flange 34 and the lower flange 36.

Even if the recording tape T is attracted by static electricity such that it is inclined in a height direction (axial direction) of the reel hub 32, since the recording tape T is wound with a certain amount of tension applied thereto, any inclination may be corrected by the tension such that the recording tape T inclines by merely a small amount (the inclination amount is reduced). As a result, an edge of the recording tape T is almost certain not to contact the upper flange 34 or the lower flange 36, and even if it does, it does not fold over.

Thus, when the free end portion Tf of the recording tape T is attached (attracted by static electricity) accurately to the outer peripheral surface 32A of the reel hub 32, as shown in FIG. 9B, the retaining member 50 moves downwards, and the feeding mechanism 42 applies a predetermined tension to the recording tape T (For example, if the recording tape T has a thickness of 6.6 μm, a tension of approximately 1 g-8 g is applied) and in this state the rotation drive gear of the rotation mechanism 46 rotates, thereby progressively winding the recording tape T around the outer peripheral surface 32A of the reel hub 32.

The tension applied to the recording tape T must be as small as possible. If, for example, the free end portion Tf of the recording tape T having the above thickness is attracted by static electricity to the outer peripheral surface 32A of the reel hub 32, and winding is performed, if the tension is greater than 8 grams, the free end portion Tf of the recording tape T may slip by a large amount from the outer peripheral surface 32A of the reel hub 32 and become detached.

Therefore, when the free end portion Tf of recording tape T having the above thickness is attached by static electricity attraction to the outer peripheral surface 32A of the reel hub 32, and the recording tape T is progressively wound around the reel hub 32, it is preferable that the tension of the recording tape T is 8 grams or less. When the rotation drive gear rotates further, and the recording tape T is progressively wound around the reel hub 32, the reel 30 eventually arrives at the state shown in FIG. 2B.

Thus, in a configuration in which the outer peripheral surface 32A of the reel 30 is brought into sliding contact (rubs) with the free end portion Tf of the recording tape T, and the free end portion is attached by static electricity generated by the friction to the outer peripheral surface 32A of the reel 30, since the attachment position of the free end portion is not restricted, it is possible to suppress variation in a height direction (axial direction) of the reel hub 32, and to stabilize the attachment position of the free end portion Tf of the recording tape T, when compared with a configuration in which a liquid for attaching the recording tape such as the alcohol L or the like is applied to the outer peripheral surface 32A of the reel 30.

Further, when a liquid for attaching the recording tape such as the alcohol L or the like is applied, and the free end portion Tf of the recording tape T is attached thereby to the outer peripheral surface 32A of the reel 30, the free end portion Tf of the recording tape T may be attached strongly to the outer peripheral surface 32A of the reel 30 In this case, if a drive apparatus malfunctions, and rotates the reel 30 such that the recording tape T thereon is completely taken up therefrom, since the recording tape T does not detach from the outer peripheral surface 32A of the reel hub 32, a load is applied to the drive apparatus, and it may become damaged as a result.

In contrast, in a configuration in which the free end portion Tf of the recording tape T is attached by static electricity to the outer peripheral surface 32A of the reel hub 32, if the drive apparatus malfunctions, and rotates the reel 30 such that the recording tape T thereon is completely taken up therefrom, the free end portion Tf of the recording tape T smoothly detaches from the outer peripheral surface 32A of the reel hub 32, and no load is applied to the drive apparatus, and there is no possibility of the drive apparatus becoming damaged.

Further, if the free end portion Tf of the recording tape T is attached to the outer peripheral surface 32A of the reel 30 by static electricity, since it is not necessary to operate of applying a liquid such as the alcohol L or the like for attaching recording tape to the outer peripheral surface 32A of the reel hub 32, overall production tact can be improved, and since it is not necessary to utilize perishable goods such as the alcohol L or the like, production costs can be decreased.

It is also possible to simplify the structure of equipment, since it is not necessary to have mechanisms that apply an ion wind or a voltage, because of a contact charging method in the present invention in which the free end portion Tf of the recording tape T is slidingly contacted (rubbed) with the outer peripheral surface 32A of the reel hub 32 to perform charging. Moreover, since it is only necessary to slidingly contact (rub) the recording tape T with the outer peripheral surface 32A of the reel 30, a further advantage exists in that a high level of positional accuracy of the outer peripheral surface 32A of the reel 30 with respect to the retaining member 50 is not demanded.

In order to attach the free end portion Tf of the recording tape T to the outer peripheral surface 32A of the reel hub 32 with an even smaller amount of charge, it is preferable to increase the contact surface area between the outer peripheral surface 32A of the reel hub 32 and the recording tape T as long as possible. Therefore, it is preferable that the recessed portion 52 has a curved surface (has a substantially arc shape when viewed from the side) with a curvature equal to or less than the curvature of the outer peripheral surface 32A of the reel hub 32.

Table 1 indicates the probability of the occurrence of folding of an edge of the recording tape T in the reel 30 in which the free end portion Tf of the recording tape T is attached by attraction by static electricity in the above described contact charge method and the recording tape T is wound around reel 30. As shown in Table 1, when the free end portion Tf of the recording tape T is attached by static electricity to the outer peripheral surface 32A of the reel hub 32, folding of the edge of the recording tape T does not occur. Thus, it can be seen that the method of attachment of the present embodiment is extremely effective.

TABLE 1

|  | Probability of edge folding |
| --- | --- |
| Attachment by static electricity | 0/100 (0%) |
| Attachment by alcohol | 20/100 (20%) |

Figure 13:
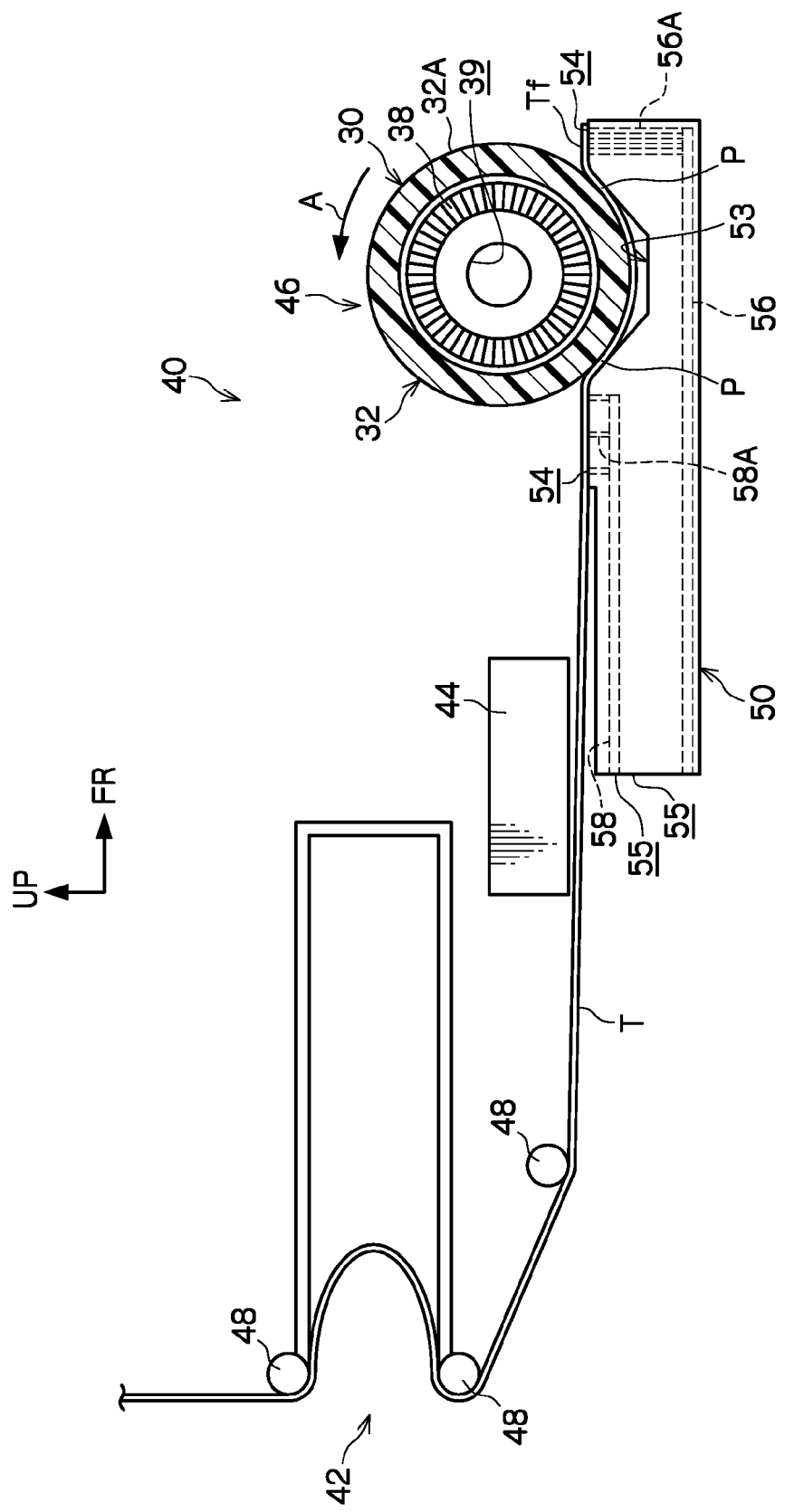
FIG. 13 is an explanatory view showing a process in which a reel hub, to which a recording tape retained by another retaining member is pressed, is rotated

The recessed portion 52 of the retaining member 50 may have a shape such as that shown in FIG. 13. That is, a recessed portion 53 shown in FIG. 13, as a contact charge portion of the retaining member 50, may have an equal leg trapezoidal shape when viewed from the side, which is longer in a front and rear direction, and deeper (larger) in an up and down direction than the above mentioned recessed portion 52.

Thereby, when the retaining member 50, which retains by suction the free end portion Tf of the recording tape T, moves upwards, and contacts the outer peripheral surface 32A of the reel hub 32, at least a portion of the recording tape T which is on present the recessed portion 53 (for example, the two contact surfaces P on the inclined surfaces) contacts (at a predetermined pressure) the outer peripheral surface 32A of the reel 30 while being supported by the recessed portion 53.

The retaining member 50 having the above configuration is advantageous in that it may still be used even if the curvature of the reel hub 32 is changed. That is, even if the diameter of the reel hub 32 is slightly changed, the free end portion Tf of the recording tape T can still be pressed and contacted to the outer peripheral surface 32A of the reel hub 32 (a sufficient contact area may be obtained).

Further, as shown in FIG. 15, a contact member 150 able to generate static electricity by friction may be provided at a front side leading end portion of the retaining member 50. The contact member 150 may slidingly contact (rub) the outer peripheral surface 32A of the reel hub 32, and the free end portion Tf of the recording tape T may be attached to the outer peripheral surface 32A of the reel hub 32 by the static electricity generated thereby.

Regardless, it is preferable in the present embodiment, that the free end portion Tf of the recording tape T is slidingly contacted (contacted with pressure) with the outer peripheral surface 32A of the reel 30, that the reel hub 32 is rotated, and that due to static electricity generated by the friction therebetween, the free end portion Tf of the recording tape T is attached to the outer peripheral surface 32A of the reel 30. Further, it is preferable that the contact member and the first contact member of the present invention is the recording tape T, and that the second contact member is the reel hub 32.

The method and apparatus for attaching a recording tape of the present invention is not limited to the content of the drawings, and the design of the present invention may be modified appropriately provided it does not depart from the gist of the present invention. For example, the recording tape cartridge 10 shown in the drawings includes a configuration in which the opening 18 is opened and closed by the door 28 sliding in a direct line running along the right wall 12A; however, the door 28 may have a substantially arc shape in plan view, and open and close the opening 18 by sliding along the circumference of a predetermined arc.

The invention claimed is:
1. A recording tape attaching method for winding a recording tape around a hub of a reel, the method comprising:
contacting the hub with a free end portion of the recording tape;

generating static electricity due to friction between the hub and the free end portion of the recording tape by rotating the hub in a state where the free end portion of the recording tape is contacted with the hub; and attaching the free end portion of the recording tape to the hub by attracting the free end portion of the recording tape to the hub by the generated static electricity.

2. The recording tape attaching method of claim 1, wherein the free end portion of the recording tape is opposite to an end portion of the recording tape at which a leader pin is attached.

3. The recording tape attaching method of claim 1, wherein the free end portion of the recording tape remains stationary as it is contacted with the rotating hub.

4. A recording tape attaching method for winding a recording tape around a hub of a reel, the method comprising:

contacting the hub with a free end portion of the recording tape;

generating static electricity due to friction between the hub and the free end portion of the recording tape by rotating the hub in a state where the free end portion of the recording tape is contacted with the hub, thereby charging the hub positively, and thereby charging the free end portion of the recording tape negatively; and attaching the free end portion of the recording tape to the hub by attracting the free end portion of the recording tape to the hub by the generated static electricity.

5. The recording tape attaching method of claim 4, wherein the free end portion of the recording tape is opposite to an end portion of the recording tape at which a leader pin is attached.

6. The recording tape attaching method of claim 4, wherein the free end portion of the recording tape remains stationary as it is contacted with the rotating hub.

7. A recording tape attaching method for winding a recording tape around a hub of a reel, the method comprising:

positioning a free end portion of the recording tape relative to the hub so as to contact the hub with the free end portion of the recording tape;

after the positioning, generating static electricity due to friction by rotating the hub in a state where the free end portion of the recording tape is contacted with the hub; and attaching the free end portion of the recording tape to the hub by attracting the free end portion of the recording tape to the hub by the generated static electricity.

8. The recording tape attaching method of claim 7, wherein the free end portion of the recording tape is opposite to an end portion of the recording tape at which a leader pin is attached.

9. The recording tape attaching method of claim 7, wherein the free end portion of the recording tape remains stationary as it is contacted with the rotating hub.

10. A recording tape attaching method for winding a recording tape around a hub of a reel, the method comprising:

positioning a free end portion of the recording tape relative to the hub so as to contact the hub with a free end portion of the recording tape;

after the positioning, generating static electricity due to friction by rotating the hub in a state where the free end portion of the recording tape is contacted with the hub, thereby charging the hub positively, and thereby charging the free end portion of the recording tape negatively; and attaching the free end portion of the recording tape to the hub by attracting the free end portion of the recording tape to the hub by the generated static electricity.

11. The recording tape attaching method of claim 10, wherein the free end portion of the recording tape is opposite to an end portion of the recording tape at which a leader pin is attached.

12. The recording tape attaching method of claim 10, wherein the free end portion of the recording tape remains stationary as it is contacted with the rotating hub.

* * * * *